(12) United States Patent
Wei et al.

(10) Patent No.: US 11,943,223 B1
(45) Date of Patent: Mar. 26, 2024

(54) SYSTEM AND METHOD FOR RESTRICTING COMMUNICATIONS BETWEEN VIRTUAL PRIVATE CLOUD NETWORKS THROUGH SECURITY DOMAINS

(71) Applicant: AVIATRIX SYSTEMS, INC., Santa Clara, CA (US)

(72) Inventors: Xiaobo Sherry Wei, Palo Alto, CA (US); Shanshan Xu, Fremont, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 191 days.

(21) Appl. No.: 17/368,689

(22) Filed: Jul. 6, 2021

Related U.S. Application Data

(60) Provisional application No. 63/150,504, filed on Feb. 17, 2021.

(51) Int. Cl.
| | |
|---|---|
| *H04L 9/40* | (2022.01) |
| *G06F 3/0482* | (2013.01) |
| *H04L 12/46* | (2006.01) |
| *H04L 12/66* | (2006.01) |

(52) U.S. Cl.
CPC ............ *H04L 63/10* (2013.01); *G06F 3/0482* (2013.01); *H04L 12/4641* (2013.01); *H04L 12/66* (2013.01); *H04L 63/0272* (2013.01); *H04L 63/20* (2013.01)

(58) Field of Classification Search
CPC ..... H04L 63/10; H04L 12/4641; H04L 12/66; H04L 63/0272; H04L 63/20; G06F 3/0482
USPC .......................................................... 726/1
See application file for complete search history.

(56) References Cited

U.S. PATENT DOCUMENTS

| | | | |
|---|---|---|---|
| 8,625,610 | B2 | 1/2014 | Asati et al. |
| 9,712,435 | B2 | 7/2017 | Teng et al. |
| 2006/0288408 | A1 | 12/2006 | Wesinger et al. |
| 2013/0086236 | A1 | 4/2013 | Baucke et al. |
| 2015/0150073 | A1 | 5/2015 | Bhalerao et al. |
| 2015/0365281 | A1 | 12/2015 | Marino et al. |
| 2016/0261506 | A1 | 9/2016 | Hegde et al. |

(Continued)

OTHER PUBLICATIONS

AWS Whitepaper. Cross-Domain Solutions with AWS. Feb. 2, 2021 (Year: 2021).*

(Continued)

*Primary Examiner* — Kambiz Zand
*Assistant Examiner* — Aubrey H Wyszynski
(74) *Attorney, Agent, or Firm* — Winstead PC

(57) ABSTRACT

A computerized method for restricting communications between virtual private cloud networks comprises creating a plurality of security domains. Each of the plurality of security domains identifies gateways associated with one or more virtual private cloud networks. Also, the method features generating transit routing data stores in accordance with each of the plurality of security domains; determining whether a connection policy exists between at least a first security domain and a second security domain of the plurality of security domains; and precluding communications between gateways associated with the first security domain and gateways associated with the second security domain in response to determining that no connection policy exists between the first security domain and the second security domain.

14 Claims, 8 Drawing Sheets

(56) References Cited

U.S. PATENT DOCUMENTS

2018/0241624 A1* 8/2018 Sun .................... H04L 41/0895
2019/0109729 A1  4/2019 De Luca

OTHER PUBLICATIONS

AWS Whitepaper. "Cross-Domain Solutions with AWS." Amazon Web Services. Feb. 2, 2021 (Feb. 2, 2021).
He at al. "Masq: Rdma for virtual private cloud." Proceedings of the Annual conference of the ACM Special Interest Group on Data Communication on the applications technologies architectures and protocols for computer communication. 2020. Aug. 14, 2020. (Aug. 14, 2020).
IBM Cloud Education. "Virtual Private Cloud VPC." Nov. 6, 2019 (Nov. 6, 2019).
PCT/US2022/016081 filed Feb. 11, 2022 International Search Report and Written Opinion dated Jun. 2, 2022.
PCT/US2022/016197 filed Feb. 11, 2022 International Search Report and Written Opinion dated Jun. 2, 2022.

* cited by examiner

US 11,943,223 B1

SYSTEM AND METHOD FOR RESTRICTING COMMUNICATIONS BETWEEN VIRTUAL PRIVATE CLOUD NETWORKS THROUGH SECURITY DOMAINS

CROSS-REFERENCE TO RELATED APPLICATIONS

This application claims the benefit of priority on U.S. Provisional Patent Application No. 63/150,504 entitled "Multi-Cloud Transit Segmentation" and filed Feb. 17, 2021, the entire contents of which are incorporated by reference herein.

FIELD

Embodiments of the disclosure relate to the field of networking. More specifically, one embodiment of the disclosure relates to restricting access between different virtual private cloud networks through established security domains.

GENERAL BACKGROUND

Over the past few years, cloud computing has provided an Infrastructure as a Service (IaaS), where resources are provided as part of a cloud computing platform (e.g., public cloud network) and made accessible to tenants as a service. One of these services allows tenants to run software components (e.g., virtual machines instances such as virtual servers) residing within the cloud computing platform. This migration of software functionality into cloud computing platforms has led to greater usage of virtual networks such as virtual private cloud networks for different public cloud providers such as Amazon® Web Services® (AWS), Microsoft® Azure Cloud Services, Google® Cloud, Oracle® Cloud, or the like.

Each of the virtual private cloud networks is an on-demand, configurable pool of shared resources, which are allocated within the cloud computing platform and provide a certain level of isolation between the different organizations or other entities (hereinafter, "users") using the cloud resources. The isolation between one virtual private cloud network user from other users utilizing the same public cloud network infrastructure may be achieved through allocation of a private Internet Protocol (IP) subnetwork on a per user basis. For each IP subnetwork, a public cloud service provider provides processing and/or storage functionality. In particular, AWS provides Amazon® Elastic Compute Cloud (EC2) services while Microsoft® Azure® provides different types of virtual machines.

Recently, for increased system throughout, the above-described virtual private cloud networks now rely on multiple, active peer-to-peer communication links. As an illustrative example, certain gateways provide connectivity to cloud software instances stored in a virtual private cloud network. Each of these gateways is configured to support two private IP-based communication links to a pair of gateways (hereinafter, "transit gateways") residing with another type of virtual private cloud network (hereinafter, "transit VPC"). However, where the transit VPC provides connectivity to a destination VPC located on a different public cloud network, this network architecture is now subject to heightened security concerns as multi-cloud connectivity increases the number of ways an attacker may get access to a virtual private cloud network. Also, it is not possible to rely significantly on security measures provided by the Amazon® Transit Gateway when the AWS public cloud network is expanded beyond the AWS infrastructure. Also, there is no policy driven option to create security segmentation provided by cloud providers.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
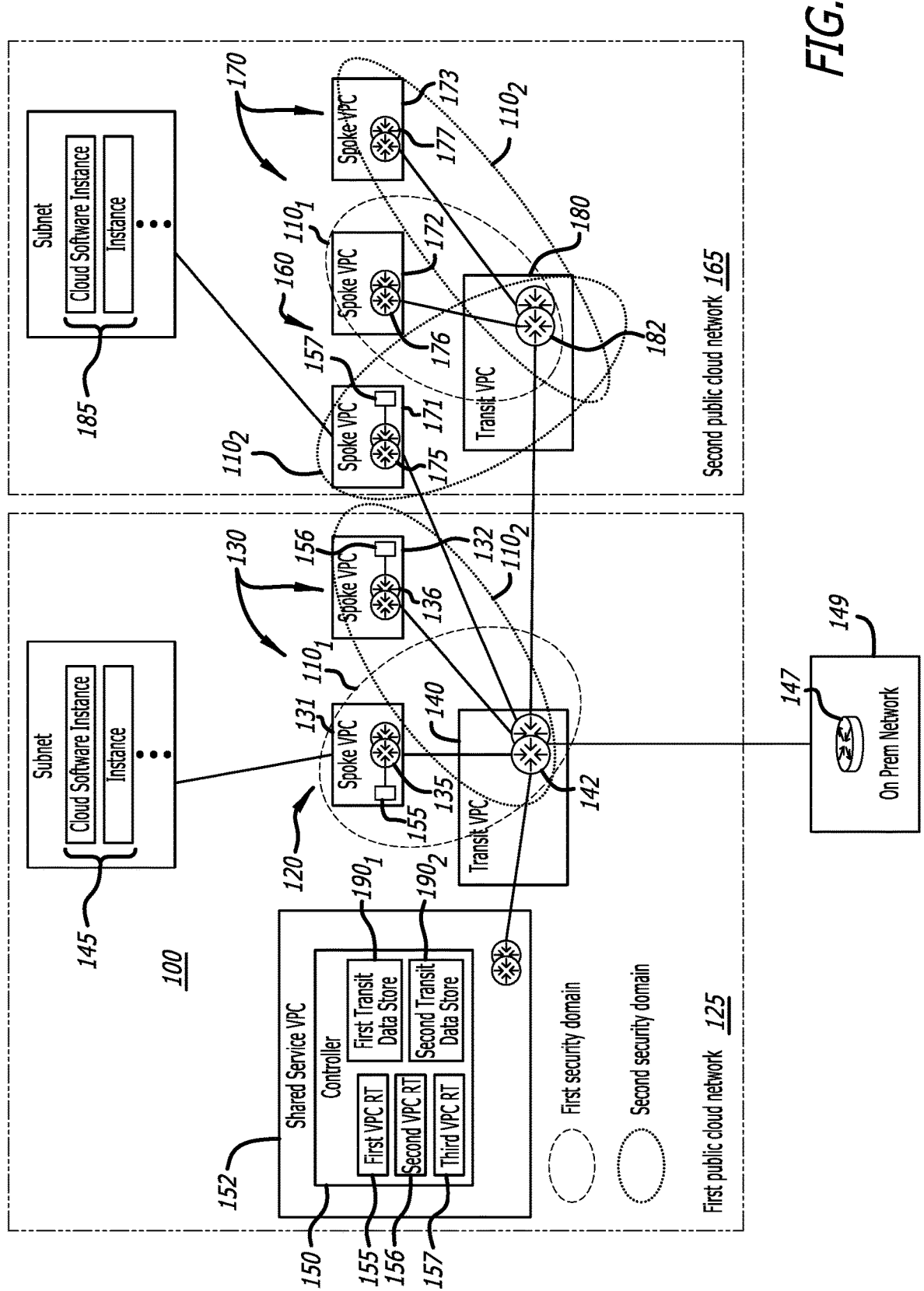
FIG. 1 is an exemplary embodiment of a multi-cloud computing platform implemented with security domains that restrict communications among gateways to those residing within the same security domain.

Embodiments of a system and method for establishing a multi-cloud computing platform implemented over different types of public cloud network infrastructures that restricts data traffic between virtual private cloud networks through different security regions. Herein, the multi-cloud computing platform achieves network isolation through use of security domains and connection policies. Each security domain identifies a group of gateways that can communicate with each other. These gateways may be deployed within the same virtual network component or within different virtual network components, where these virtual network components may reside within the same region of a public cloud network, within different regions of the same public cloud network, or within different public cloud networks. As an illustrative example a first set (e.g. one or more) of gateways may operate within a first virtual network component supported by underlying network infrastructure provided by Amazon® Web Services (AWS) public cloud network while a second set of gateways may operate within a second virtual network component supported by Microsoft® Azure® public cloud network or Oracle® Cloud. Each connection policy identifies permitted communications across different security domains.

Herein, for clarity, each of the virtual network components, sometimes referred to as a virtual private cloud network for AWS deployment, a virtual network (VNet) for Azure® deployment or virtual cloud network (VCN) for an Oracle® Cloud deployment for example, shall be universally referred to herein as a "virtual private cloud network" or "VPC" for clarity purposes. Hence, the multi-cloud computing platform may feature (i) a first plurality of virtual network components each operating as a virtual private cloud network that maintains cloud resources accessible by a set of gateways (hereinafter, "spoke VPCs"); (ii) a second plurality of virtual network components each operating as a virtual private cloud network that supports the routing of messages from/to the spoke VPCs (hereinafter, "transit VPCs"); and/or (iii) a shared services networking infrastructure including a controller for updating and maintaining data stores for spoke VPCs and/or transit VPCs to maintain routing information in accordance with deployed security domains and connection policies.

More specifically, according to one embodiment of the disclosure, each spoke VPC includes a set (e.g., two or more) of gateways (hereinafter, "spoke gateways"), which are communicatively coupled to one or more cloud software instances with a particular subnet or particular subnets. Some or all of these cloud software instances may include executable applications. Similarly, each transit VPC may feature a gateway cluster including a set of gateways. The set of gateways deployed within the transit VPC (hereinafter, "transit gateways") control the routing of messages between spoke VPCs, and in effect, control the routing of messages between cloud software instances deployed in different spoke VPCs. As shown, each of the spoke gateways and transit gateways may be accessed in accordance with a unique Classless Inter-Domain Routing (CIDR) routing address to propagate messages over the multi-cloud computing platform.

Besides communicatively coupled to spoke gateways, the transit gateways may be communicatively coupled to one or more network edge devices (e.g., virtual or physical routers, etc.) deployed within an on-prem network (hereinafter, "on-prem network devices"). Herein, the transit VPC is configured to control the propagation of data traffic between a source spoke VPC that receives the data traffic from a cloud software instance and either a destination spoke VPC or the on-prem network. Additionally, according to embodiments of this disclosure, the transit VPC is further configured to restrict data traffic flow by controlling the propagation of data traffic to gateways residing within the same security domain or residing in different security domains provided a connection policy is established to permit gateway communications between these different security domains.

Further details of the logic associated with one embodiment of the scalable multi-cloud computing platform are described below.

I. Terminology

In the following description, certain terminology is used to describe features of the invention. In certain situations, the terms "logic" and "component" is representative of hardware, software or a combination thereof, which is configured to perform one or more functions. As hardware, the logic (or component) may include circuitry having data processing or storage functionality. Examples of such circuitry may include, but are not limited or restricted to a processor (e.g., microprocessor, one or more processor cores, a programmable gate array, a microcontroller, an application specific integrated circuit, etc.), semiconductor memory, or combinatorial logic.

Alternatively, or in combination with the hardware circuitry described above, the logic (or component) may be software in the form of one or more software modules. The software module(s) may be configured to operate as a virtual hardware component (e.g., virtual processor) or a virtual network device including one or more virtual hardware components. The software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

VPC routing table: A VPC routing table is a logical construct for instructing a software instance as to how to reach a selected destination. The destination may constitute another software instance, which may be identified by a routable network address. The VPC routing table includes a plurality of entries, where each entry includes a routable network address of the destination and an identifier for a software component with routing functionality that constitutes a next hop towards the destination (target). The identifier may include a gateway identifier for example.

Gateway: This term may be construed as a virtual or physical logic with data routing functionality. As an illustrative example, the gateway may correspond to virtual logic, such as a data routing software component that is assigned an Internet Protocol (IP) address within an IP address range associated with a VPC including the gateway. Multiple gateways are deployed in a multi-cloud computing platform, which may control the ingress/egress of data traffic into/from a VPC. While having similar architectures, the gateways may be identified differently based on their location/operability within a public cloud network. For example, a "spoke" gateway is a gateway that supports routing between cloud software instances and "transit" gateways, where each transit gateway is configured to further assist in the propagation of data traffic (e.g., one or more messages) from one spoke gateway to another spoke gateway within the same spoke VPC or within different VPCs. Alternatively, in some embodiments, the gateway may correspond to physical logic, such as an electronic device that is communicatively coupled to the network and assigned the hardware (MAC) address and IP address.

IPSec tunnels: Secure peer-to-peer communication links established between gateways of neighboring virtual network components such as neighboring VPCs. The peer-to-peer communication links may be secured through a secure network protocol suite referred to as "Internet Protocol Security" (IPSec). These IPSec tunnels are represented in gateways by virtual tunnel interface (VTI) and the tunnel states are represented by VTI states.

Security domain: A controller-enforced network of software components associated with one or more VPCs that are permitted to exchange and transfer data. Hence, VPCs within the same security domain are permitted to communicate with each other while VPCs within different security domains are unable to communicate without a connection policy. A "connection policy" is one or more rules enforced to allow for cross security domain connectivity.

Computerized: This term generally represents that any corresponding operations are conducted by hardware in combination with software.

Message: Information in a prescribed format and transmitted in accordance with a suitable delivery protocol. Hence, each message may be in the form of one or more packets, frames, or any other series of bits having the prescribed format.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General System Architecture

Referring now to FIG. 1, an exemplary embodiment of a multi-cloud computing platform 100 implemented with a plurality of security domains $110_1$-$110_N$ (N>1) is shown, where each security domain $110_1$-$110_N$ restricts communications among gateways to those residing within the same security domain. Herein, the multi-cloud computing platform 100 is configured to provide connectivity between resources 120 of a first public cloud network 125 and resources 160 of a second public cloud network 165. Herein, according to one embodiment of the disclosure, the first public cloud network 125 corresponds to an Amazon® Web Services (AWS) cloud network and the second public cloud network 165 corresponds to a Microsoft® Azure® cloud network, which is different from the first public cloud network 125.

According to one embodiment of the disclosure, the resources 120 of the first public cloud network 125 feature one or more spoke VPCs 130, which is (are) communicatively coupled to a first transit VPC 140 including one or more transit gateways 142. Herein, as shown, a first spoke VPC 131 of the one or more spoke VPCs 130 may be configured with connectivity to some of the cloud software (application) instances 145 and the transit gateway(s) 142 of the first transit VPC 140. A network edge device 147 (e.g. virtual or physical router) for an on-premises network 149 is communicatively coupled to the transit gateway(s) 142 for the transmission of data traffic to and receipt of data traffic from the on-premises network 149.

Herein, as for each of the spoke VPCs 130, the first spoke VPC 131 is configured, in accordance with a first VPC routing table 155 managed by a controller 150 within a shared VPC 152, to exchange data traffic from certain cloud appliance instance(s) 145 with a selected gateway of a set of (e.g., two or more) gateways 135 maintained in the first spoke VPC 131. Similarly, a second spoke VPC 132 of the one or more spoke VPCs 130 may be configured with connectivity to some of the cloud software instances 145. In particular, for this embodiment, the second spoke VPC 132 is configured, in accordance with a second VPC routing table 156 also managed by the controller 150, to exchange data traffic between some cloud appliance instance(s) 145 and a selected gateway of a set of gateways 136 maintained in the second spoke VPC 132. These multiple spoke VPCs may formulate the construct of a first portion of the multi-cloud computing platform 100.

Additionally, according to one embodiment of the disclosure, the resources 160 of the second public cloud network 165 may feature one or more spoke VPCs 170, such as a third, fourth and fifth spoke VPCs 171-173, and a second transit VPC 180 including transit gateways 182. Herein, each of these spoke VPCs 171 may be configured to communicate with different cloud software (application) instance(s) 185. For example, in accordance with the third VPC routing table 157 managed by the controller 150, certain cloud application instances 185 may be configured to exchange data traffic with a selected gateway of a set of (e.g., two or more) gateways 175 maintained in the third spoke VPC 171. These multiple spoke VPCs may formulate the construct of this second portion of the multi-cloud computing platform 100.

As shown, a plurality of security domains $110_1$-$110_N$ may be configured to restrict communications among spoke VPCs across the same public cloud network 125 or 165 or spoke VPCs across different public cloud networks 125 and 165, as shown. As an illustrative embodiment, a first security domain $110_1$ may restrict communications to remain among the gateways 135 associated with the first spoke VPC 131 of the first public cloud network 125 and the gateways 175 associated with the third spoke VPC 171. Likewise, a second security domain $110_2$ may restrict communications to remain among gateways 136 associated with the second spoke VPC 132 as well as the gateways 176 and 177 residing within the fourth and fifth spoke VPCs 172 and 173 of the second public cloud network 165. Transit gateway(s) 142 and 182 serve to interconnect gateways within the spoke VPCs within the same security domain $110_1$ or $110_2$ or within different security domains $110_1$ and $110_2$ based on connection policies (described below).

These security domains $110_1$ and $110_2$ may be configured by altering the routing information maintained within at least a first transit routing data store $190_1$ associated with the first transit gateway 142 and a second transit routing data store $190_2$ associated with the second transit gateway 182. The transit routing data stores $190_1$ and $190_2$ may constitute routing tables. Hence, prior to routing a message to/from a source spoke VPC (e.g., first spoke VPC 131) to a destination spoke VPC (e.g., third spoke VPC 171), the first transit routing data store $190_1$ is considered to determine whether such communications are available and are not available when such communications are restricted by the security domains $110_1$ and $110_2$.

Figure 2:
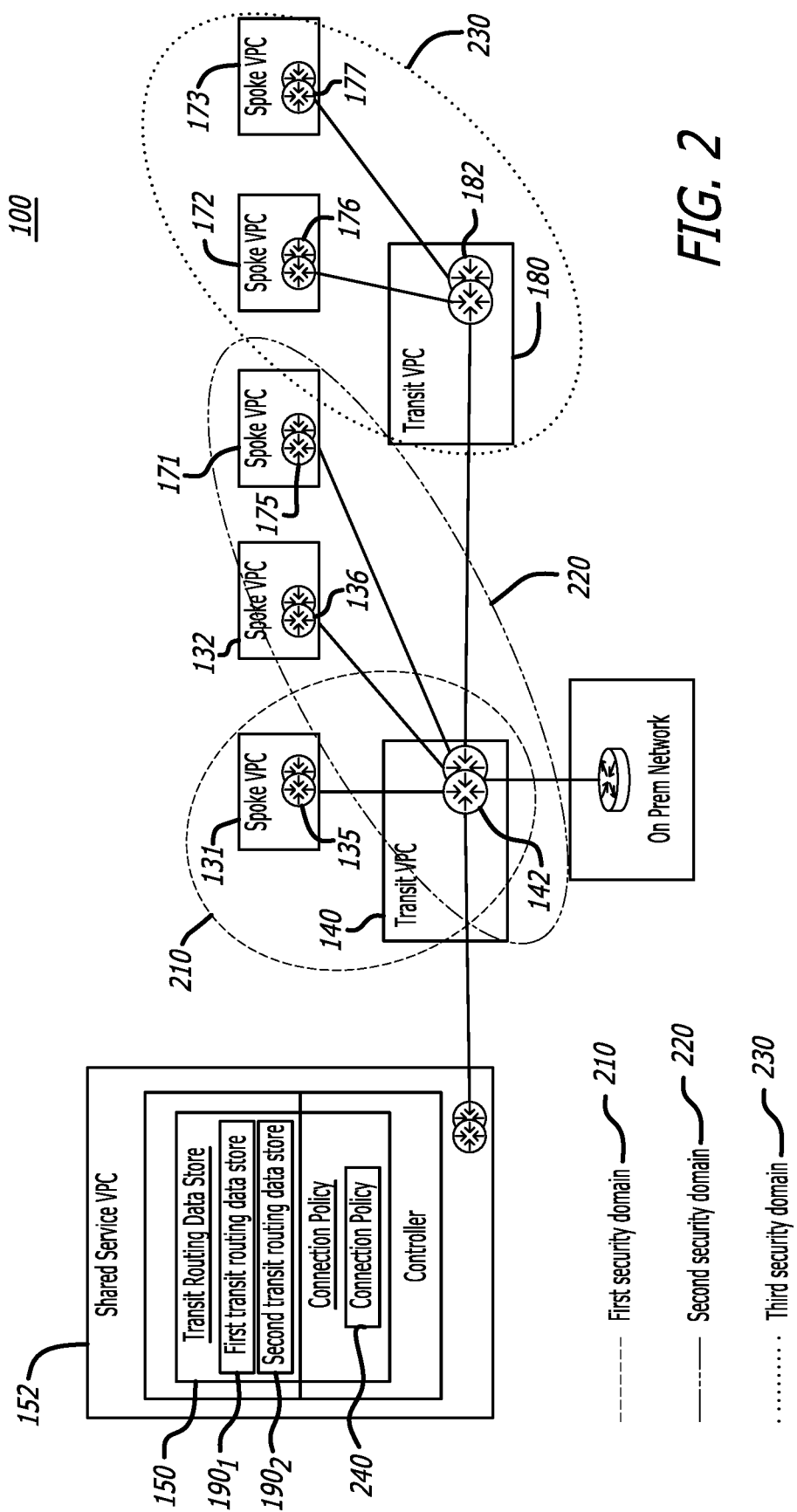
FIG. 2 is an illustrative embodiment of the multi-cloud computing platform of FIG. 1 implemented with a first security domain including one or more gateways communicatively coupled to one or more gateways residing within a second security domain through a connection policy.

Referring now to FIG. 2, another illustrative embodiment of the multi-cloud computing platform 100 of FIG. 1 is shown, where the multi-cloud computing platform 100 is implemented with a plurality of security domains 200 including a first security domain 210, a second security domain 220, and a third security domain 230. Herein, the first security domain 210 includes gateways 135, the second security domain 220 includes gateways 136 and 175, and the third security domain 230 includes gateways 176 and 177. Gateways 135, 136 and 175 are configured to communicate with each other through a first connection policy 240. As a result, the multi-cloud computing platform 100 provides network isolation among gateways spanning multiple regions and/or multiple cloud networks through security domains 210/220 and 230 as well as the connection policies such as the first connection policy 240.

More specifically, as shown in FIG. 2, the gateways 136 associated with the second spoke VPC 132 (e.g., AWS VPC) and the gateways 175 associated with the third spoke VPC 171 (e.g., Azure® VNet) can communicate with each other while gateways 176 and 177 associated with the fourth VPC 172 and fifth VPC 173 are isolated and precluded from communications with gateways 135, 136 and 175. Normally, there is no cross communication between the gateways 135 associated with the first security domain 210 and the gateways 136 and 171 associated with the second security domain 220 without one of the connection policies (e.g., connection policy 240) providing for such connectivity.

Herein, after setting of the connection policy 240 by a user (e.g., administrator, device user, etc.), the controller 150 accesses content within the connection policy 240 to determine that the resources maintained in the first security domain 210 are permitted to communicate with the resources maintained in the second security domain 220. In particular, gateways 135/136 associated with the spoke VPCs 131/132 of the first public cloud network 125 and the gateways 175 within the spoke VPC 171 of the second public cloud network 165 can communicate with each other via a transit gateway. To accomplish this, the controller 150 dynamically programs and updates both transit routing data stores $190_1$ and $190_2$ so that instances in spoke VPCs can communicate with each other via transit gateways 142 and/or 182.

Figure 3:
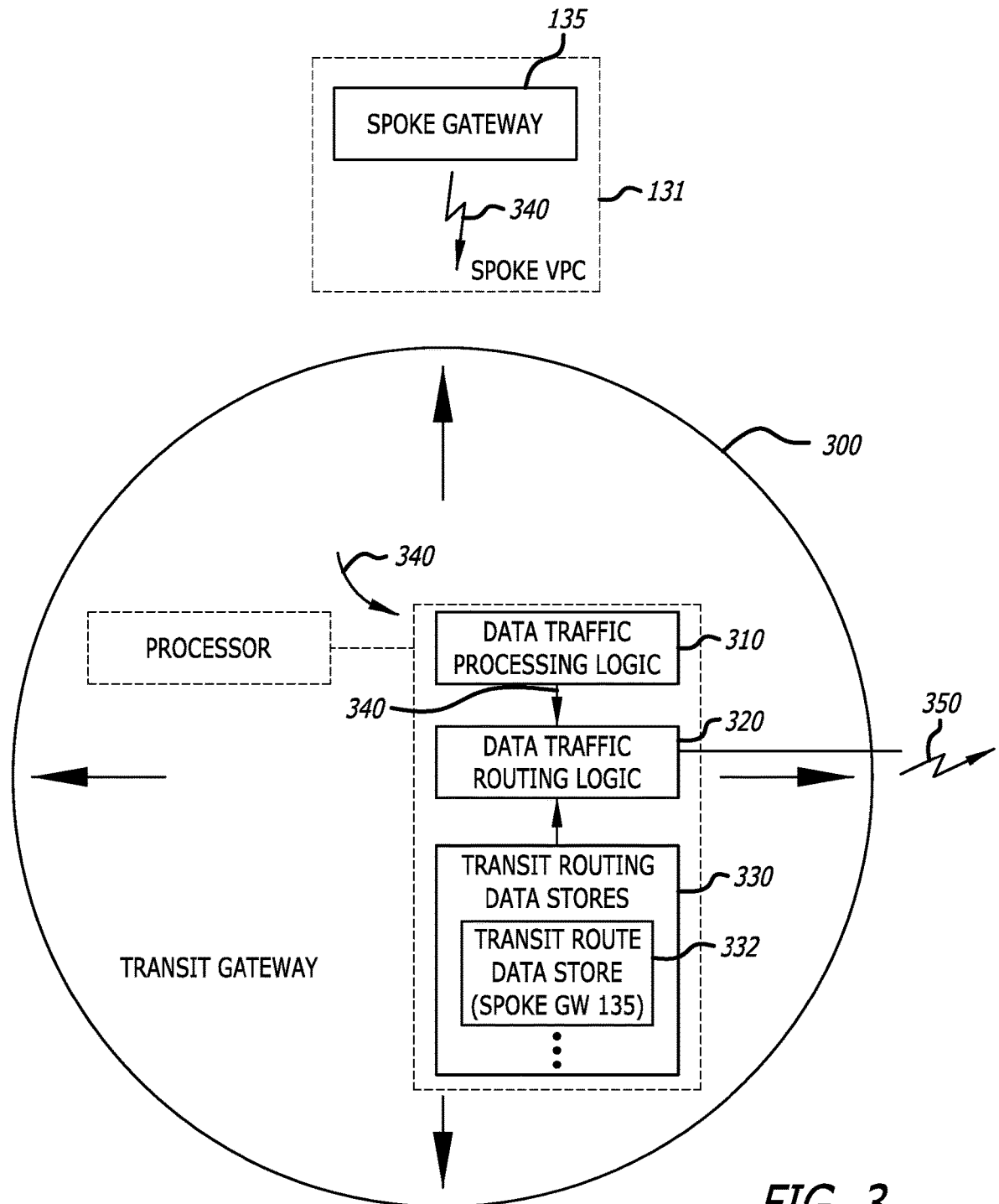
FIG. 3 is an exemplary embodiment of a transit gateway deployed within the transit virtual network component (VPC/Vnet) of FIGS. 1-2, including security domain data stores and a connection policy data store.

Referring to FIG. 3, an exemplary embodiment of a transit gateway 300, being one of the transit gateways 142 deployed within the transit VPC 140, is shown. This transit gateway 300 constitutes a software component overlaying resources of a public cloud network infrastructure, such as an AWS-based transit VPC or an Azure®-based transit VNet of FIG. 1 for example. The software component includes logic that is executed by a (virtual) processor, which is a compute service provided by the cloud provider and illustrated for completeness. Herein, according to one embodiment of the disclosure, the transit gateway 300 includes data traffic processing logic 310, data traffic routing logic 320 and one or more transit routing data stores 330, where the transit routing data stores 310 may maintain routing information for data traffic sources (e.g., router for on-premises network, spoke VPCs, other transit VPCs, etc.) relying on the transit gateway 300 for routing an incoming message 340 to a destination.

The data traffic processing logic 310 is configured to receive the incoming message 340 from a data traffic source, such as the spoke gateway 135 deployed as part of the spoke VPC 131 of FIG. 1 that is provisioned to access the transit gateway 300. Upon receipt of the incoming message 340, the data traffic processing logic 310 is configured to parse and conduct analytics on the incoming message 340 to determine a destination for the incoming message 340. Where the destination is reachable from the spoke gateway 135, namely any established security domain includes the VPC or network in which the destination resides and/or a connection policy, contents of the incoming message 340 are provided to the data traffic routing logic 320. Where the destination is not reachable from the spoke gateway 135, the incoming message 340 is discarded and/or an error message may be provided to the data traffic source and/or controller for reporting to the network administrator.

The data traffic routing logic 320 may be configured to access a transit routing data store 332 of the transit routing data stores 330 to determine a next hop (e.g., gateway associated with the destination, transit gateway, etc.) for transmission of content associated with the incoming message 340 thereto. As an illustrative example, as shown in FIG. 1, for transmission from an instance within the first spoke VPC 131 to an instance within the third spoke VPC 171, the transit routing data store 332 may identify the transit gateway 182 overlaying cloud infrastructure associated with a different cloud provider. Thereafter, the data traffic routing logic 320 may organize the content of associated with the incoming message 340 (e.g., encapsulate, reinsert into a payload and/or header of a new message, etc.) to produce an output message 350 for transmission to the next hop identified by the transit routing data stores 330 and considered to be the optimal path based on selected policies and/or parameters (e.g., hop count to the destination, security parameters, etc.).

III. Security Domain Formation

Figure 4A:
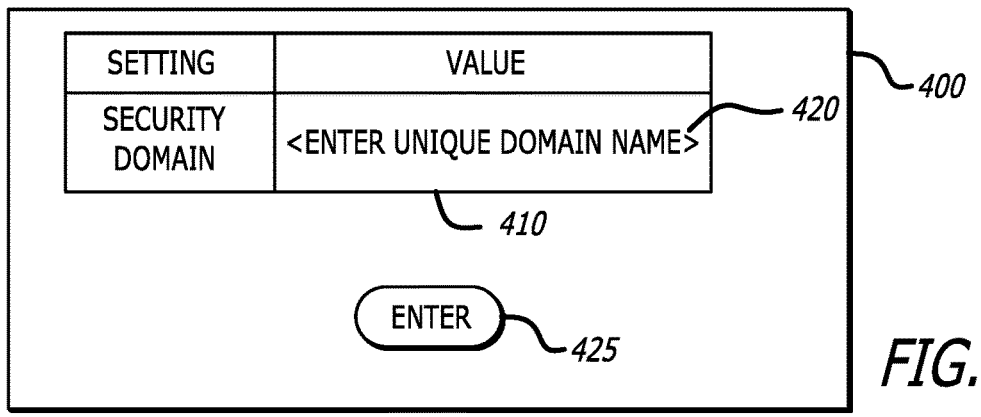
FIGS. 4A-4C illustrate an exemplary embodiment of a graphical user interface (GUI) for programming of one or more security domains within the multi-cloud computing platform and the connection policies associated with these security domains.
Figure 4B:
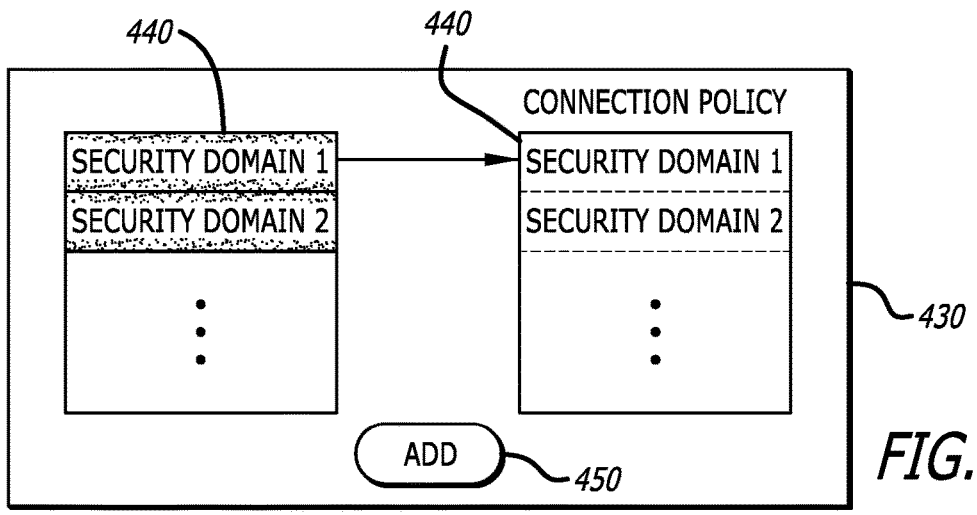
Figure 4C:
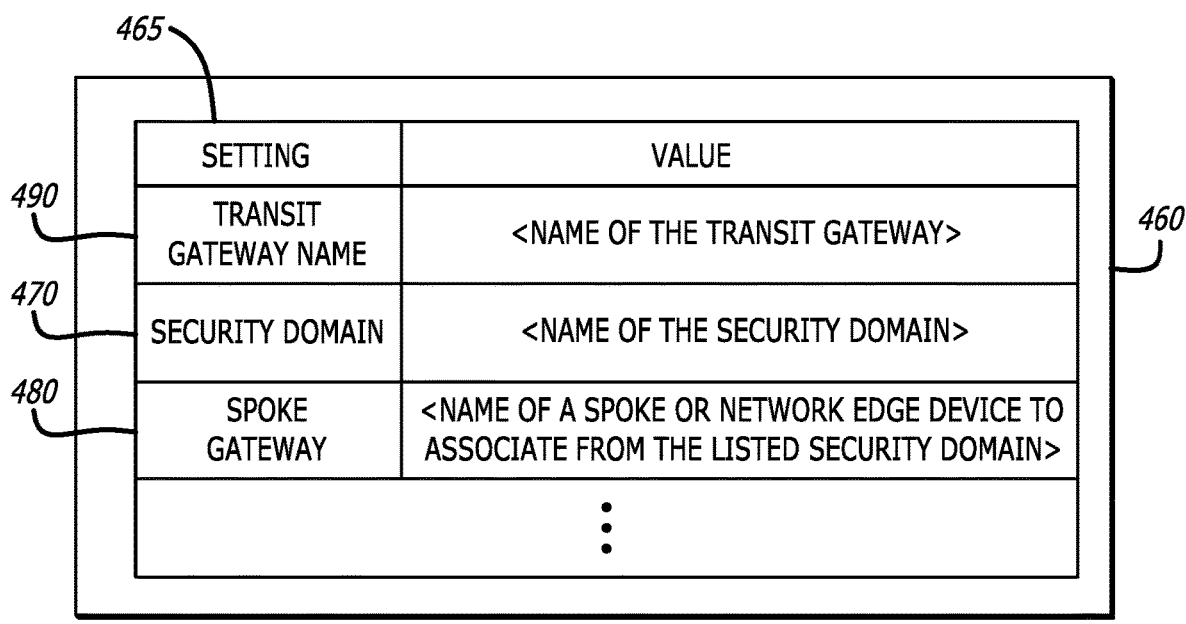

Referring now to FIGS. 4A-4C, exemplary embodiments of a series of graphical user interfaces (GUI) for establishing the security domain(s) within the multi-cloud computing platform 100 and optional connection policies associated with these security domains is shown. The GUIs may be generated by software that is executed by one or more processors, namely physical processors or logical processors that are based on one or more physical processors. Herein, as shown in FIG. 4A, a first GUI 400 constitutes a web page accessible by a user to create a security domain by entry of a unique domain name 420 associated with that security domain within an assigned field 410 (e.g., Dev_Domain). At selection of the domain name 420 and completion of this process stage (e.g., activating "Enter" button 425), the security domain is created, but no spoke gateway or network edge devices are identified. This process may be repeated to create multiple security domains.

Upon creation of the security domain(s), a connection relationship may be established between multiple security domains through a second GUI 430 as shown in FIG. 4B. In particular, the second GUI 430 may include a graphical element 440, such as a drop-down menu listing the security domains available on the multi-cloud computing platform 100. By selecting multiple security domains and activating the "Add" graphical element 450, a connection policy is generated between the selected security domains. The connection policy permits spoke gateways in the selected security domains to communicate with each other despite the fact that these spoke gateways are in different security domains.

Thereafter, as shown in FIG. 4C, the third GUI 460 may include input fields 465 to associate each of the security domains with a transit gateway and populate each of the security domains with a spoke gateway and/or a network edge device (e.g., a router for connection with an on-premises network) communicatively coupled to the transit gateway. The third GUI 460 establishes the network segmentation based on identifying the security domain 470, spoke gateway (or network edge device) 480 to be included as a member of the security domain 470, and a transit gateway 490 to which the spoke gateway (or network edge device) 480 is in communication. These fields may be auto-populated from different entries so that entry of the transit gateway 490 automatically identifies the spoke gateway (or network edge device) 480 or provides a pull-down menu with the spoke gateway/edge device options. Although not shown, but in a similar graphical representation, it is contemplated that another GUI, similar in features as the third GUI 460, may be used to disassociate a spoke gateway or network edge device with an identified security domain.

Figure 5A:
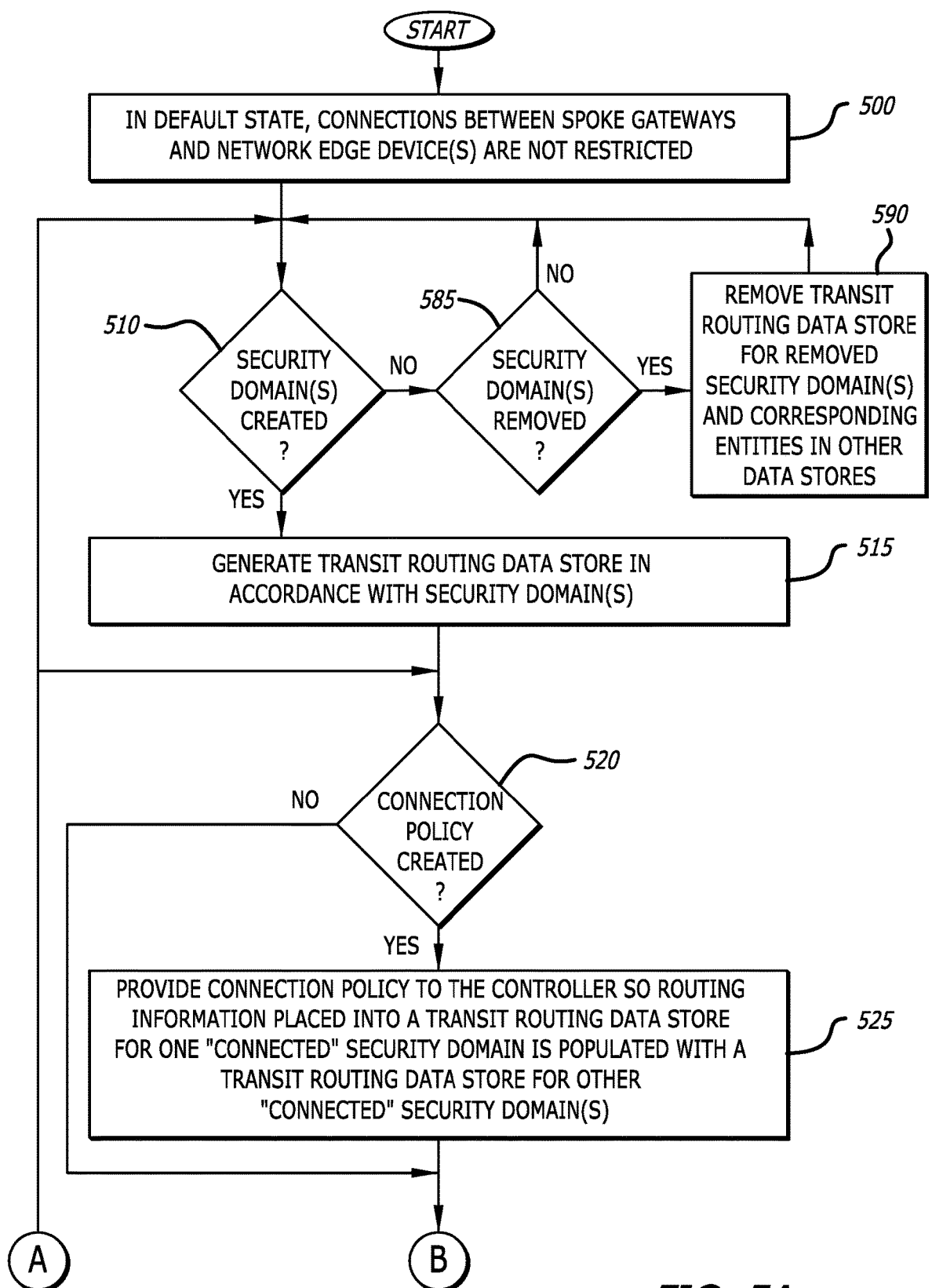
FIGS. 5A-5B illustrate an exemplary embodiment of operations by the controller to create constructs directed to security domains and connection policies associated with these security domains.
Figure 5B:
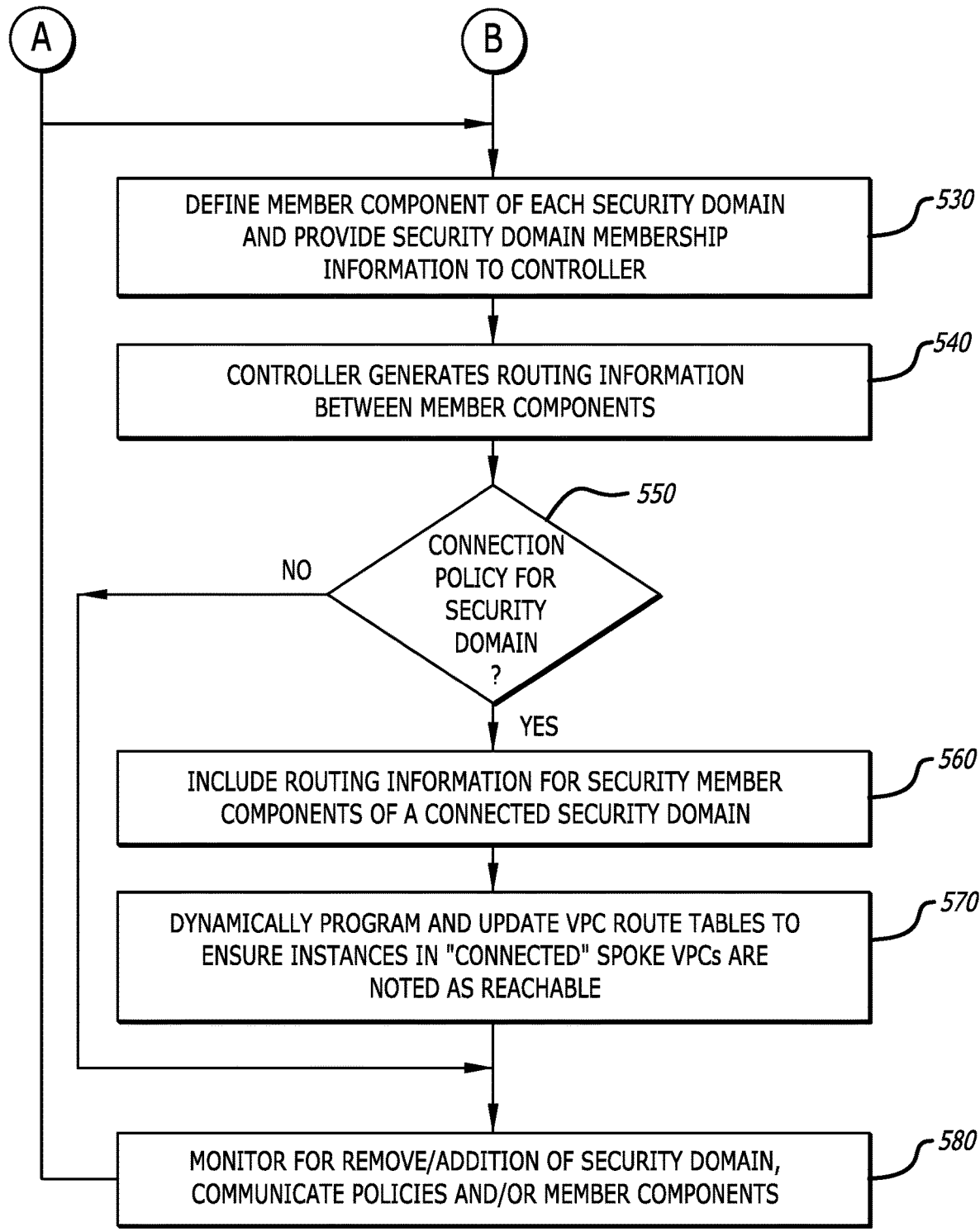

Referring to FIGS. 5A-5B, an exemplary embodiment of operations by the controller to create constructs directed to security domains and connection policies associated with these security domains is shown. Herein, the controller maintains the available routing for each of the transit gateways set forth in the multi-cloud computing platform. In a default state, without any security domains, the transit routing data store for each transit gateway may be configured to have active connections directed to most, if not all, spoke VPCs and other transit gateways forming the multi-cloud computing platform (operation 500). However, in response to creation of a security domain assigned a security domain name, the controller generates a transit routing data store associated with that security domain (operations 510 and 515). In the event that a plurality of security domains are created, the controller receives information associated with any connection policies established between two or more of the plurality of security domains (operation 520). The identification of the connection policies is needed to ensure that routing connections associated with a spoke gateway placed into a security domain are also populated into the transit routing data store associated with other connected security domain(s) (operation 525).

Thereafter, as each security domain is configured to define member components for that security domain, namely one or more spoke gateways and/or network edge devices (e.g., router of on-premises network, etc.) and the transit gateway to which these member components are communicatively coupled, the controller receives the security domain membership information (operation 530). Based on the security domain membership information, the controller is configured to include the routing connections directed to the spoke gateway(s) and/or network edge device(s) within transit routing data store(s) associated with the security domain maintained in each transit gateway to which at least one of these spoke gateway(s) and/or network edge device(s) are in communication (operation 540). Also, the controller determines whether there exists a connection policy associated with the security domain, and if so, the controller alters transit routing data store(s) associated with the "connected" security domain to include the routing connections directed to the spoke gateway(s) and/or network edge device(s) (operations 550 and 560). These transit routing data stores pertain to the transit gateways in communication with the spoke gateway(s) and/or network edge device(s) added to the security domain.

Furthermore, based on the routing connections, the controller dynamically programs and updates the VPC route tables so that instances in different spoke VPCs in the same domain can communicate and instances in different spoke VPCs in different security domains, without connection policies, are precluded from communication by removal of any such routing connections (operation 570). The controller continues to monitor for the removal/addition of security domains, connection policies and/or member components (operations 580, 585 and 590).

IV. General Security Domain Operability

Figure 6A:
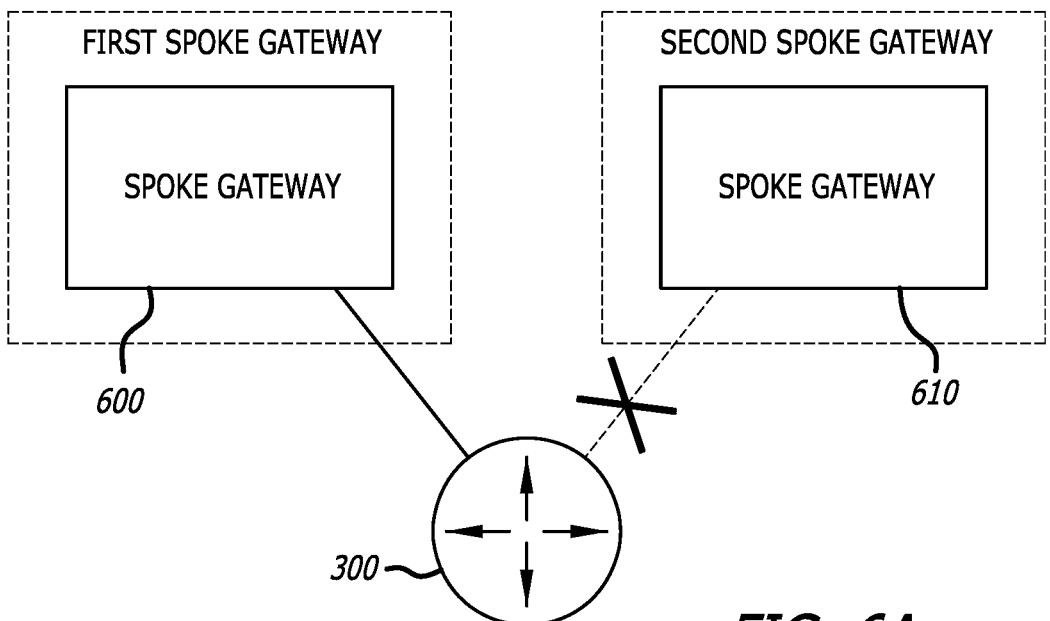
FIGS. 6A-6B are exemplary embodiments of permitted and non-permitted interoperability between two spoke gateways residing in different security domains of the multi-cloud computing platform of FIGS. 1-2.
Figure 6B:
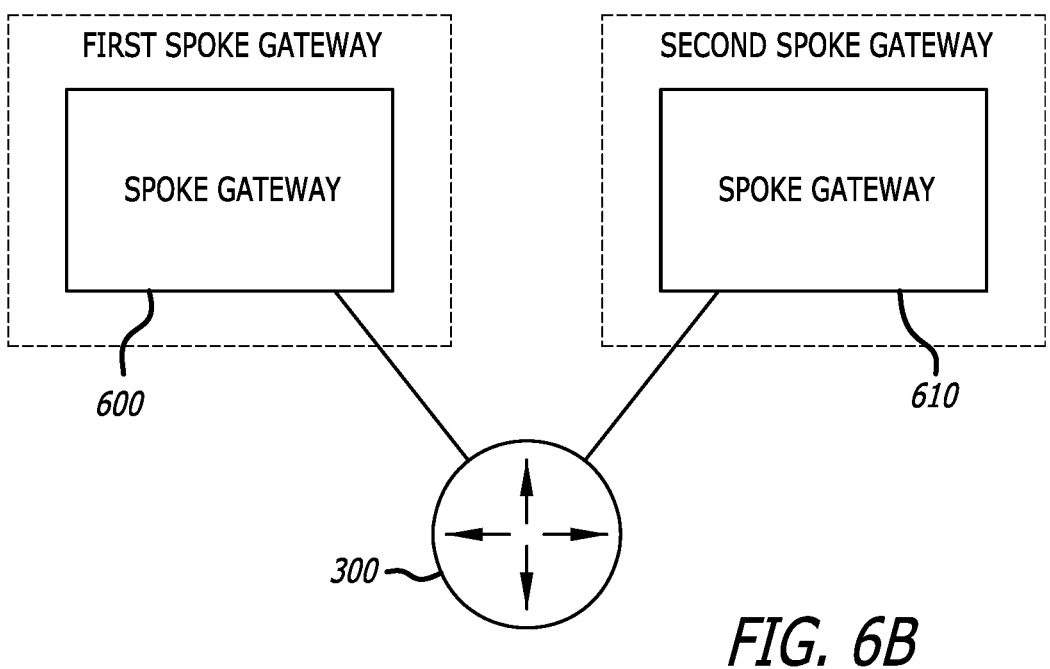

Referring to FIGS. 6A-6B, exemplary embodiments of permitted and non-permitted interoperability between two spoke gateways residing in different security domains of the multi-cloud computing platform of FIGS. 1-2. For this illustrated example, the first spoke gateway 600 may operate as the first spoke gateway 135 residing within the first spoke VPC 131 of FIG. 1 and the second spoke gateway 610 may operate as the second spoke gateway 136 residing within the second spoke VPC 132. Herein, the first spoke gateway 600 resides in a different security domain than the second spoke gateway 610, where there is no connection policy established between the first spoke gateway 600 and the second spoke gateway 610. As a result, via the transit gateway 300, the first spoke gateway 600 associated with the first security domain (e.g., security domain $110_1$ of FIG. 1) is unable to communicate with the second spoke gateway 610 associated with the second security domain (e.g., security domain $110_2$ of FIG. 1).

In contrast, as shown in FIG. 1 and FIG. 6B, the first spoke gateway 600 may reside in either the same security domain as the second spoke gateway 610 or within different security domains provided there exists a connection policy with these spoke gateways 600 and 610. As a result, via the transit gateway 300, the first spoke gateway 600 associated with the first security domain is able and permitted to communicate with the second spoke gateway 610 associated with the second security domain.

V. Operational Flow

Figure 7:
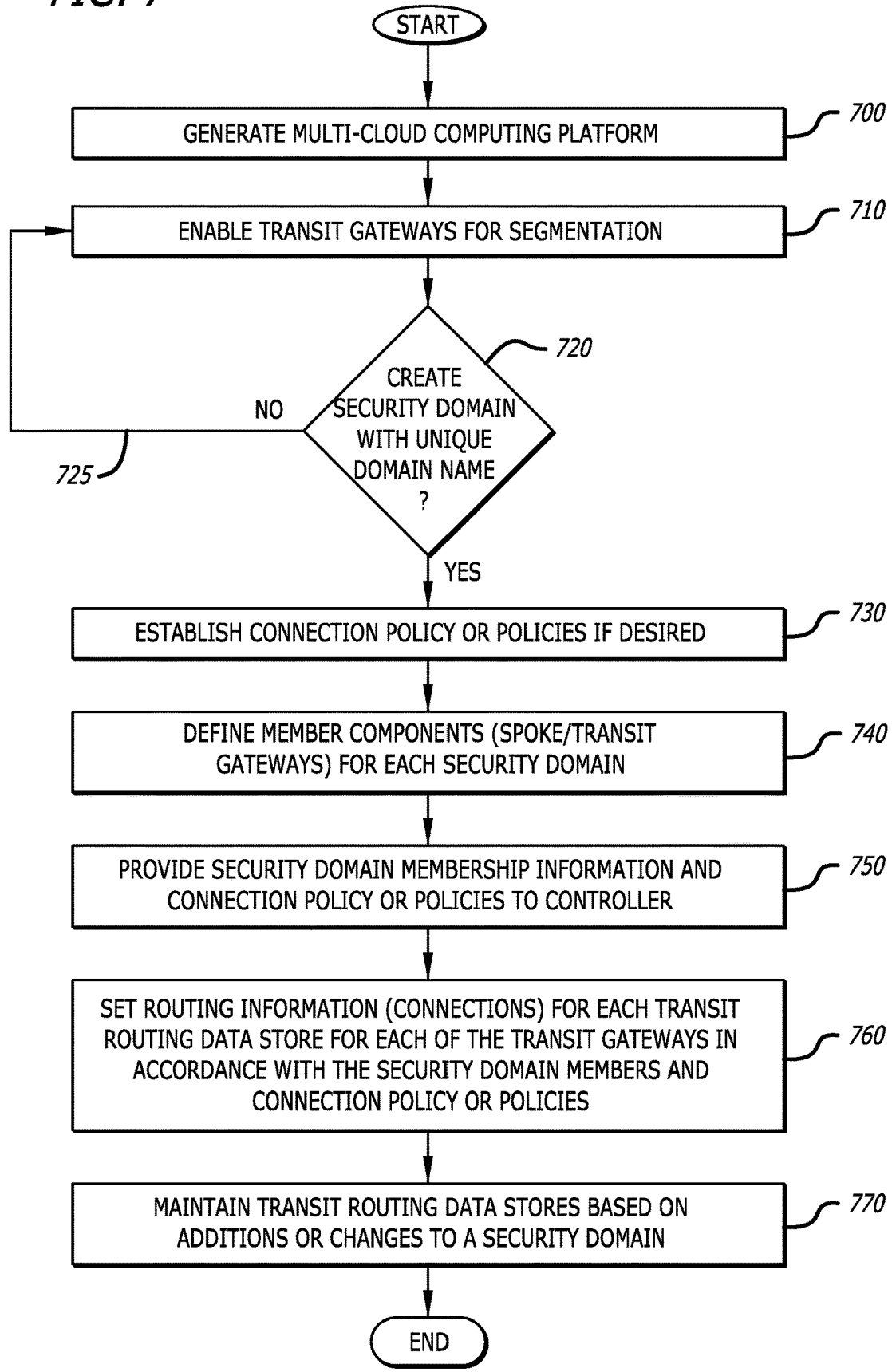
FIG. 7 is an exemplary embodiment of the operations for establishing a multi-cloud transit segmentation architecture.

Referring to FIG. 7, an exemplary embodiment of the operations for conducting transit segmentation of a multi-cloud computing platform through security domains and connection policies is shown. First, the multi-cloud computing platform is generated (operation 700). Herein, the multi-cloud computing platform features a first set of spoke VPCs and a first set of transit VPCs associated with an underlying first public cloud network infrastructure along with a second set of spoke VPCs and a second set of transit VPCs associated with an underlying second public cloud network infrastructure. Thereafter, some or all of the transit gateways within the transit VPCs are enabled for segmentation (operation 710). Where a transit gateway is not enabled for segmentation, the transit gateway will not be configured to be part of any security domain.

Thereafter, a security domain is created and assigned a unique security domain name (operation 720). This operation may be conducted in succession to create two or more security domains (operations 725). Alternatively, this operation may be conducted asynchronously, where one or more security domains may be created to dynamically alter the segmentation and cause the controller to update the transit routing data stores accordingly. For clarity, the operations will focus on the creation of two security domains.

After the security domains are created, a connection policy can be established to formulate a connection relationship between different security domains (operation 730). The two connected security domains imply that spoke gateways in each of these security domains can communicate with each other despite the fact that they reside in different domains. Also, the presence of the connection policy is monitored by the controller to ensure that routing connections associated with the connected spoke gateway are replicated for different transit routing data store(s) maintained in different transit gateway(s).

Thereafter, each security domain is configured to define member components for that security domain by associating the security domain to one or more spoke gateways and the transit gateway to which these spoke gateways are communicatively coupled (operation 740). The security domain membership information (e.g., routable network address associated with the spoke gateway and its corresponding transit gateway, etc.) is provided to the controller, which is utilized, along with the connection policy, to set the routing connections directed to the spoke gateway(s) within transit routing data store(s) associated with the security domain maintained in each transit gateway to which at least these spoke gateway(s) are in communication (operations 750 and 760).

The segmentation of the multi-cloud computing platform is dynamic, as the segmentation may be altered by removal/addition of or changes to the security domains, connection policies and/or member components (operations 770).

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A computerized method for restricting communications between virtual private cloud networks, comprising:
    creating a plurality of security domains, each of the plurality of security domains identifies gateways associated with one or more virtual private cloud networks;
    generating transit routing data stores in accordance with each of the plurality of security domains;
    determining whether a connection policy exists between at least a first security domain and a second security domain of the plurality of security domains; and
    precluding communications between gateways associated with the first security domain and gateways associated with the second security domain in response to determining that no connection policy exists between the first security domain and the second security domain.

2. The computerized method of claim 1 further comprising:
    allowing communications between the gateways associated with the first security domain and gateways associated with the second security domain in response to determining that the connection policy exists between the first security domain and the second security domain.

3. The computerized method of claim 2 further comprising:
    updating routing information within each of the transit routing data stores to include routing information associated with routings between the gateways associated with the first security domain and gateways associated with the second security domain.

4. The computerized method of claim 1 further comprising:
    monitoring for changes to an addition of a security domain to the plurality of security domains to generate a transit routing data store associated with the added security domain, the transit routing data store operates as a routing table to identify communications that are available from and to gateways associated with the added security domain.

5. The computerized method of claim 1 further comprising:
    generating a connection policy that allows communications between the gateways associated with the first security domain and gateways associated with the second security domain in response to desiring communications therebetween.

6. The computerized method of claim 5, wherein the generating of the connection policy includes generating a graphic user interface (GUI) that includes a first graphical element identifying the plurality of security domains and a second graphical element that, upon selecting of the first security domain and the second security domain and activation of the second graphical element, generating the connection policy enabling the gateways associated with the first security region to communicate with the gateways associated with the second security region.

7. The computerized method of claim 2, wherein the connection policy corresponds to one or more rules enforced to allow for cross security domain connectivity.

8. A multi-cloud computing platform for restricting communications between virtual private cloud networks, comprising:
    a processor; and
    software that, upon execution by the processor, is configured to (i) create a plurality of security domains, each of the plurality of security domains identifies gateways associated with one or more virtual private cloud networks, (ii) generate transit routing data stores in accordance with each of the plurality of security domains,
    (iii) determine whether a connection policy exists between at least a first security domain and a second security domain of the plurality of security domains, and
    (iv) preclude communications between gateways associated with the first security domain and gateways associated with the second security domain in response to determining that no connection policy exists between the first security domain and the second security domain.

9. The multi-cloud computing platform of claim 8, wherein the software, upon execution, is further configured to allow communications between the gateways associated with the first security domain and gateways associated with the second security domain in response to determining that the connection policy exists between the first security domain and the second security domain.

10. The multi-cloud computing platform of claim 9, wherein the software, upon execution, is further configured to update routing information within each of the transit routing data stores to include routing information associated with routings between the gateways associated with the first security domain and gateways associated with the second security domain.

11. The multi-cloud computing platform of claim 8, wherein the software, upon execution, is further configured to monitor for changes to an addition of a security domain to the plurality of security domains to generate a transit routing data store associated with the added security domain, the transit routing data store operates as a routing table to identify communications that are available from and to gateways associated with the added security domain.

12. The multi-cloud computing platform of claim 8, wherein the software, upon execution, is further configured, upon request by a user, to generate a connection policy that allows communications between the gateways associated with the first security domain and gateways associated with the second security domain in response to desiring communications therebetween.

13. The multi-cloud computing platform of claim 12, wherein the software to generate the connection policy by at least generating a graphic user interface (GUI) that includes a first graphical element identifying the plurality of security domains and a second graphical element that, upon selecting of the first security domain and the second security domain and activation of the second graphical element, generating the connection policy enabling the gateways associated with the first security region to communicate with the gateways associated with the second security region.

14. The multi-cloud computing platform of claim 12, wherein the connection policy corresponds to one or more rules enforced to allow for cross security domain connectivity.

\* \* \* \* \*